(12) United States Patent
Seo (10) Patent No.: US 8,787,985 B2
(45) Date of Patent: Jul. 22, 2014

(54) SCREEN CAPTURE METHOD OF MOBILE COMMUNICATION TERMINAL

(75) Inventor: Hyungsu Seo, Gyeonggi-Do (KR)

(73) Assignee: Rsupport Co., Ltd., Seoul (KR)

( * ) Notice: Subject to any disclaimer, the term of this patent is extended or adjusted under 35 U.S.C. 154(b) by 183 days.

(21) Appl. No.: 13/601,470

(22) Filed: Aug. 31, 2012

(65) Prior Publication Data

US 2013/0143620 A1   Jun. 6, 2013

(30) Foreign Application Priority Data

Dec. 1, 2011   (KR) .......................... 10-2011-0127405

(51) Int. Cl.
*H04B 1/38* (2006.01)
*H04M 3/42* (2006.01)

(52) U.S. Cl.
USPC .......................................... 455/566; 345/1.1

(58) Field of Classification Search
USPC .......................................... 455/566; 345/1.1
See application file for complete search history.

(56) References Cited

U.S. PATENT DOCUMENTS

2012/0040720 A1* 2/2012 Zhang et al. .................. 455/557

FOREIGN PATENT DOCUMENTS

| JP | 2002-305732 A | 10/2002 |
| KR | 10-2004-0065821 A | 7/2004 |
| KR | 10-2006-0047954 A | 5/2006 |
| KR | 10-2008-0018396 A | 2/2008 |

* cited by examiner

*Primary Examiner* — Lee Nguyen
(74) *Attorney, Agent, or Firm* — Edwards Wildman Palmer LLP; Kongsik Kim

(57) ABSTRACT

Disclosed is a method of extracting and processing screen information outputted through a display of a mobile communication terminal, in which an output screen of the mobile communication terminal is extracted and merged with a previously stored device image, and an image data synthesizing the outer appearance of the mobile communication terminal and an output image is created and stored. An image combining an output screen and an outer appearance of the mobile communication terminal is created and stored in capturing a display screen of the mobile communication terminal.

7 Claims, 7 Drawing Sheets

SCREEN CAPTURE METHOD OF MOBILE COMMUNICATION TERMINAL

CROSS REFERENCE TO RELATED APPLICATIONS

This application claims priority to Korean Application No. 10-2011-0127405, filed Dec. 1, 2011. The entire content of the aforementioned patent application is incorporated herein by this reference.

BACKGROUND

1. Field of the Invention

The present invention relates to a method of extracting and processing screen information outputted through a display of a mobile communication terminal, in which an output screen of the mobile communication terminal is extracted and merged with a previously stored device image, and an image data synthesizing the outer appearance of the mobile communication terminal and an output image is created and stored.

2. Background of the Related Art

With the advancement in the mobile communication technologies, communication methods limited to voice communication or short message services have been evolved into Internet access accomplished through a mobile communication network based on a communication protocol such as WAP (Wireless Application Protocol) or the like. As high functionality mobile communication terminals including input/output devices such as a high resolution touch screen and the like, as well as large-capacity control operating units and memory devices, are now being distributed together with rapid increases in data processing rates through the mobile communication network, processing of high-resolution images and execution of diverse multimedia supporting application programs, as well as Internet access based on TCP/IP (Transport Control Protocol/Internet Protocol), have begun being enabled through a wireless LAN (Local Area Network).

Since a high functionality mobile communication terminal, which is generally referred to as a smart phone, employs a high resolution touch screen and a control operating unit related thereto, high functionality mobile communication terminals typically implement a graphical user interface (GUI) comparable to those of general desktop computers, as well as to a conventional keypad type handling environment. Accordingly, convenience of user's handling and readability of the GUI are improved, and application programs capable of performing various tasks based on control operation and memory capacity, remarkably improved compared with those of conventional mobile communication terminals, can be mounted and executed.

Particularly, as Internet access of high functionality mobile communication terminals through a mobile communication network and a wireless local area network (LAN) is generalized and social network services (SNS) are expanded, information exchange between users of a mobile communication terminal is rapidly increased. As the mobile communication terminals move away from conventional functions limited to merely a communication device and advances to multimedia devices or portable computers become prevalent, users voluntarily providing or exchanging a variety of information through the Internet based on the functions and portability of the mobile communication terminal are increasing as well.

In addition, as the handling convenience, functions, user interfaces and the like, as well as the processing capacity of the hardware and the operating system of the mobile communication terminal, are remarkably enhanced compared with those of conventional mobile communication terminals, a user may freely set or modify screens, handling methods and the like, and thus mobile communication terminals are being used as a means for expressing personality of the user rather than just a communication device.

As described above, through the mobile communication terminal moving away from functions of a conventional simple communication device and developing into a portable computer, the Internet can be accessed without restriction of time and space, and in addition, all types of information exchanges including exchanges of characters, images and voices are allowed as well. Particularly, as Internet information exchange in a private sector such as a blog or an SNS service is actively performed, utilization of the mobile communication terminal has increased in all aspects of daily life, as well as in business.

As described above, since the mobile communication terminal is used as a means for expressing personality of a user, working beyond a simple communication device, users constructing personalized screens and handling environments and posting the screens or environments through a blog or an SNS service, or opening to public examples of using application programs mounted on the mobile communication terminal through the Internet are increased as well.

Examples of using the mobile communication terminal in relation to the blog and the SNS service include capturing a display screen of the mobile communication terminal, posting the display screen through the blog or the SNS service, and setting the display screen as a profile image of the SNS service. That is, when a material describing a method of using the mobile communication terminal or a method of using an application program mounted on the mobile communication terminal is posted on a blog, a display screen of the mobile communication terminal is captured and inserted in the posted material, or a distinctive background screen or the like of the mobile communication terminal is captured and used as a profile image for identifying the creator of the material posted through the SNS service.

Figure 1:
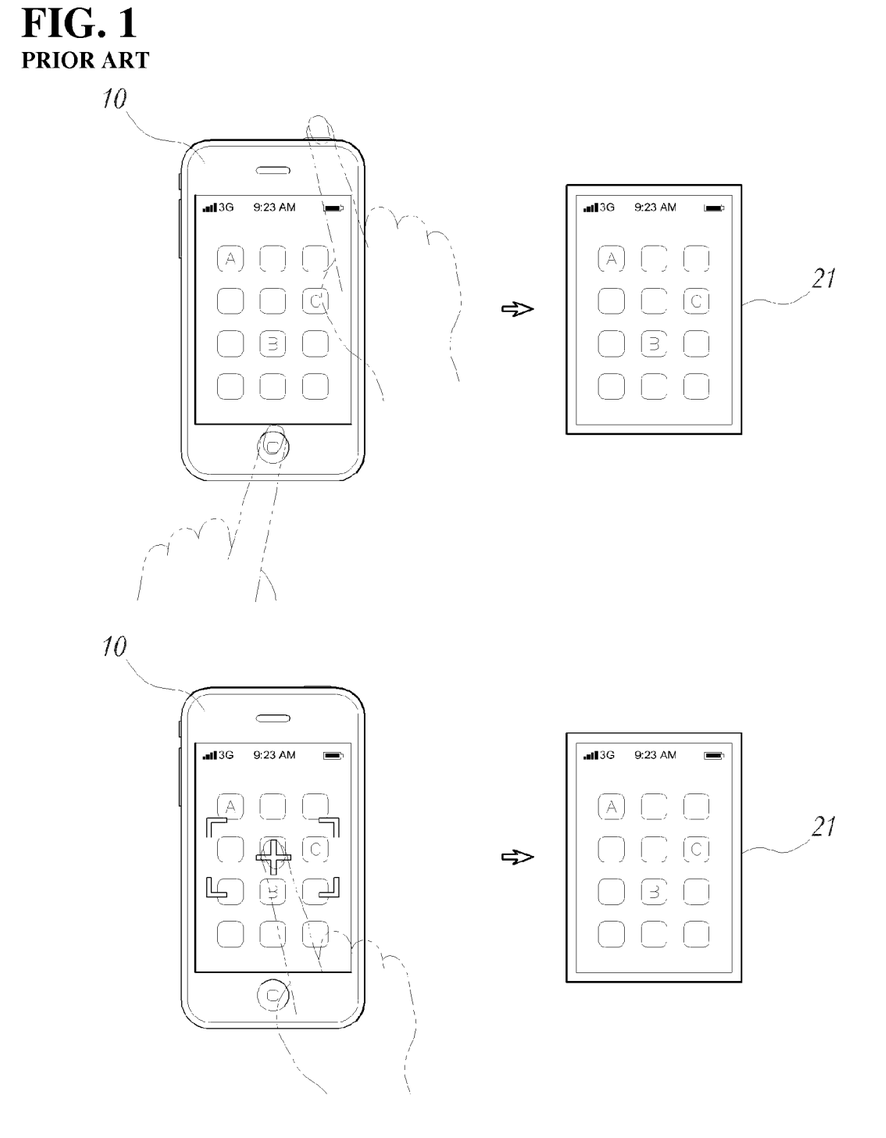
FIG. 1 is a view showing an example of a screen capture state according to a conventional technique.

Conventional methods of capturing a display output screen of the mobile communication terminal can be divided into a method of capturing the display output screen by handling buttons of the mobile communication terminal utilizing the functions embedded in the operating system of the mobile communication terminal 10 as shown in the upper portion of FIG. 1 and a method of capturing the display output screen by executing a separate application program and touching a handling area implemented on the touch screen. However, the two methods are slightly different only in the method of handling the mobile communication terminal 10, and it may be said that there is no notable difference in that both of the methods are performed by a capture program modularized in the operating system or mounted on the mobile communication terminal 10 in the form of an application program and extracted image information is recorded in the memory device of the mobile communication terminal 10.

Regardless of whether the capturing method is a method embedded in the operating system or a method of an application program, a conventional capture program extracts screen data 21 outputted from the display of the mobile communication terminal 10 as shown in FIG. 1, and the shape of the mobile communication terminal 10 other than the display is not included in the screen data 21.

Accordingly, in posting a screen capture image of the mobile communication terminal 10 through a blog or an SNS service, the type of the mobile communication terminal 10 cannot be identified and difference from the other photographed images cannot be expressed only by the captured display screen data 21. Furthermore, there is a limitation in realistic expression, and thus it is unable to give an impression that the captured display screen data 21 posted on the blog is a display image of the mobile communication terminal 10 when the captured display screen data 21 is viewed.

In addition, there are cases where users record display capture images of their own mobile communication terminals 10 in a profile image of the SNS service, centering on users of mobile communication terminals 10 interested in information communication devices having a high preference in new products. Even in these cases, the type of a mobile communication terminal cannot be identified only by the captured display screen data 21, and furthermore, a variety of desires of a user cannot be satisfied.

SUMMARY

The present invention has been made in consideration of the above objects, in which when a capture program extracts a display screen data of the mobile communication terminal, the capture program synthesizes a previously obtained outer appearance image of the mobile communication terminal with the screen data right after extracting the screen data, and thus a synthetic data containing the outer appearance of the mobile communication terminal can be created and stored in real-time.

According to present invention, there is provided a screen capturing method of a mobile communication terminal employing an image display as an output means as a mobile station of a mobile communication network. More specifically, the method for capturing a display out screen of a mobile communication terminal includes executing a capture program mounted on the mobile communication terminal and extracting screen data being outputted on the display of the mobile communication terminal; reading device image data containing a shape of the mobile communication terminal from a memory device of the mobile communication terminal, by the capture program; and creating synthetic data by combing the read device image data with the screen data and recording the synthetic data in the memory device of the mobile communication terminal, by the capture program.

In addition, there is provided a screen capturing method of a mobile communication terminal that executes a capture program mounted on a computer connected to the mobile communication terminal and extracts screen data being outputted on the display of the mobile communication terminal; reads device image data containing a shape of the mobile communication terminal from a memory device of the computer, by the capture program; and creates synthetic data by combing the read device image data with the screen data and recording the synthetic data in the memory device of the computer, by the capture program.

In addition, there is provided a screen capturing method of a mobile communication terminal that executes a capture program mounted on a computer connected to the mobile communication terminal and extracting screen data being outputted on the display of the mobile communication terminal; transmits identification information of the mobile communication terminal connected to the computer to a server at a remote site through an Internet, by the capture program; reads device image data containing a shape of the mobile communication terminal by inquiring a database using the received identification information, and transmits the device image data to the computer, by the server; and receiving the device image data, creating a synthetic data by combing the device image data with the screen data, and recording the synthetic data in a memory device of the computer, by the capture program of the computer.

DESCRIPTION OF SYMBOLS

10: Mobile communication terminal
21: Screen data
22: Device image data
30: Synthetic data
40: Computer
50: Server
51: Database

DETAILED DESCRIPTION OF EMBODIMENTS

The preferred embodiments of the invention will be hereafter described in detail, with reference to the accompanying drawings.

Although the below exemplary embodiment is described as using a single processor to execute the above processes, it is understood that the above processes may also be performed by a by a plurality of processors on a plurality of controllers/devices throughout the vehicle without departing from the metes and bounds of the exemplary embodiment of the present invention.

Furthermore, the control logic of the exemplary embodiment of the present invention may be embodied as non-transitory computer readable media on a computer readable medium containing executable program instructions executed by the processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion.

Figure 2:
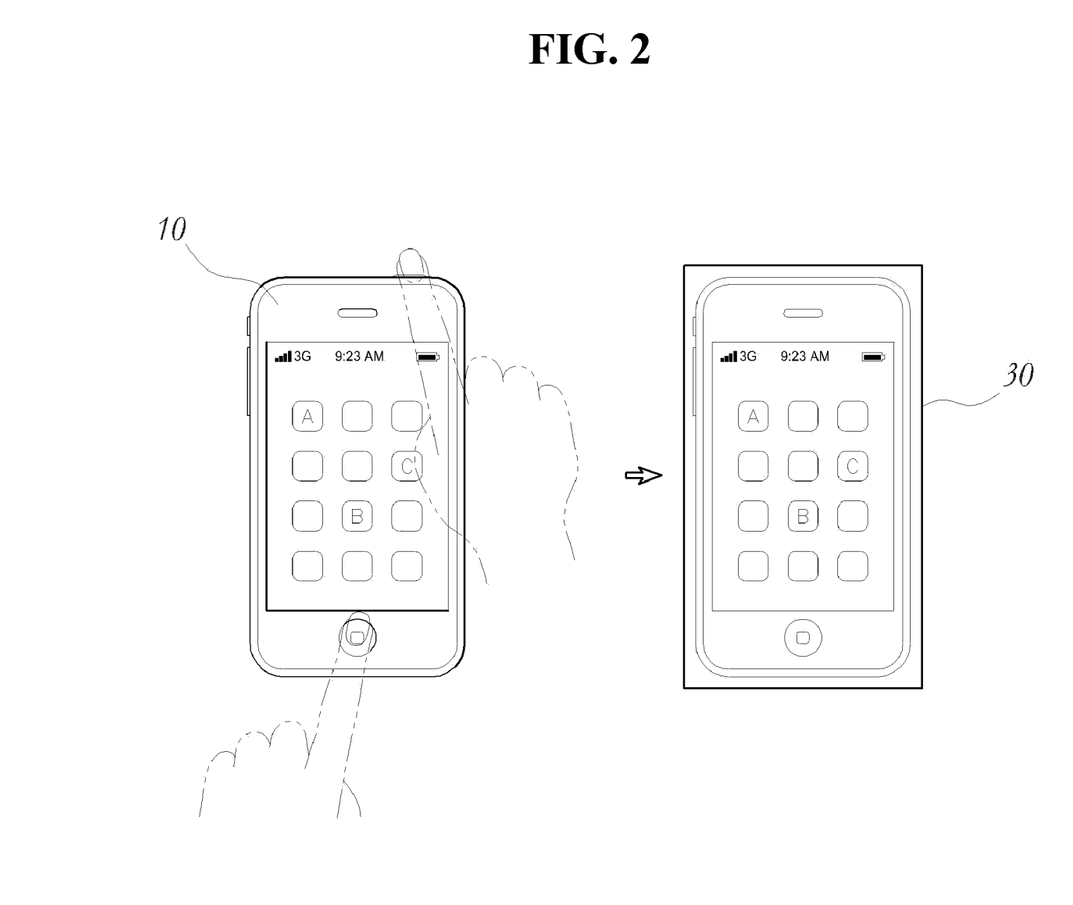
FIG. 2 is a view showing an example of a screen capture state according to an exemplary embodiment of the present invention.

First, FIG. 2 is a view illustrating an example of a screen capture state according to an exemplary embodiment of the present invention. As shown in FIG. 2, synthetic data 30 created via an exemplary embodiment of the present invention, i.e., image information created as a final result, contains an outer appearance image of a corresponding mobile communication terminal 10, as well as screen data 21 outputted through the display of the mobile communication terminal 10, and thus visual information the same as the mobile communication terminal 10 is provided as a result. Such synthetic data 30 is created and stored by a capture program mounted on the mobile communication terminal 10, and the process of creating and storing the synthetic data 30 is configured with sequential elements described below.

First, the capture program modularized in the operating system of the mobile communication terminal 10 or mounted on the mobile communication terminal 10 in the form of an application program is executed, and the screen data 21 being outputted on the display of the mobile communication terminal 10 is extracted.

Figure 3:
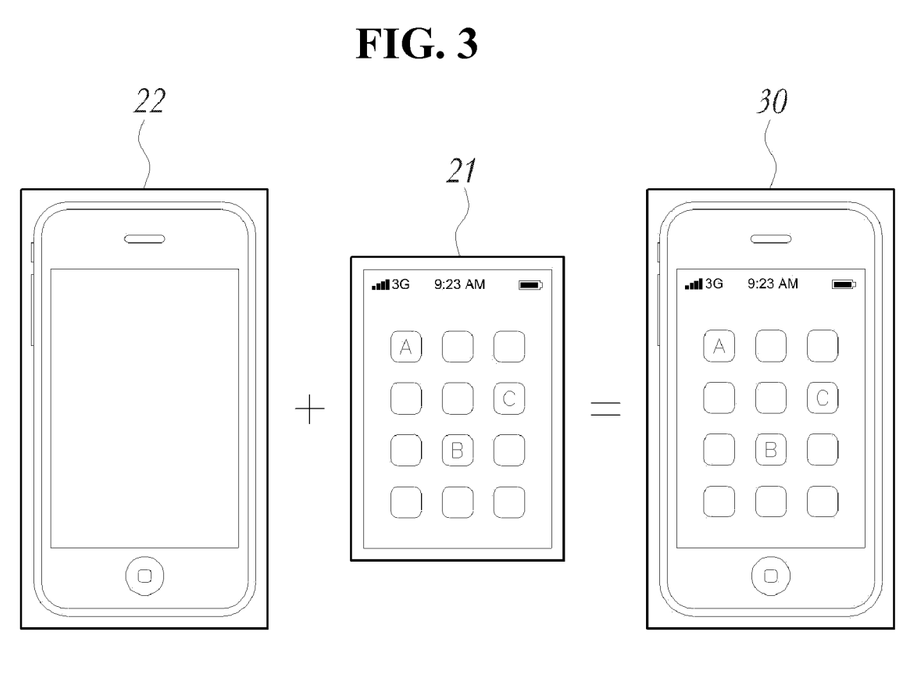
FIG. 3 is a view showing a method of creating synthetic data according to an exemplary embodiment of the present invention.

Next, the capture program reads a device image data containing the shape of the corresponding mobile communication terminal 10 from a memory device of the mobile communication terminal 10, creates the synthetic data 30 by combining the read device image data and the extracted screen data 21 as shown in FIG. 3, and stores the created synthetic data 30 in the memory device of the mobile communication terminal 10.

Figure 4:
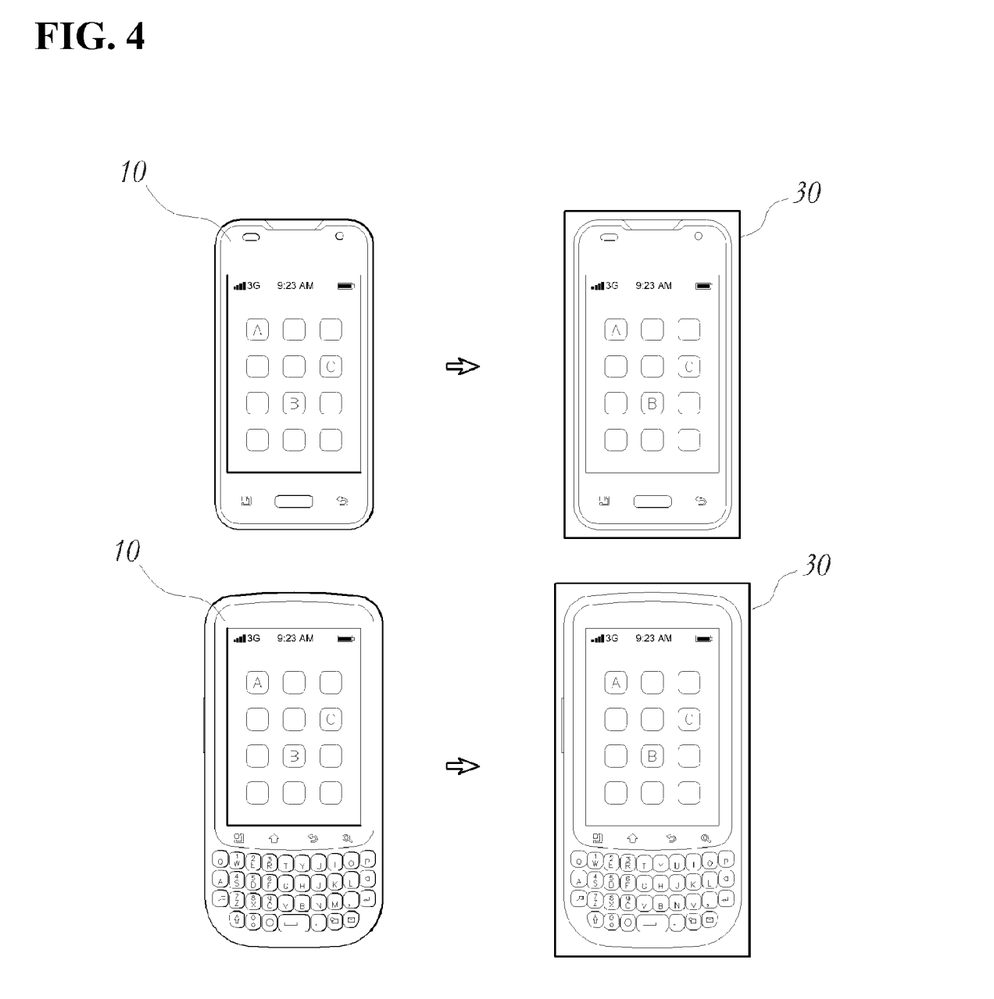
FIG. 4 is a view showing an example of a screen capture state of each device according to an exemplary embodiment of the present invention.
Figure 5:
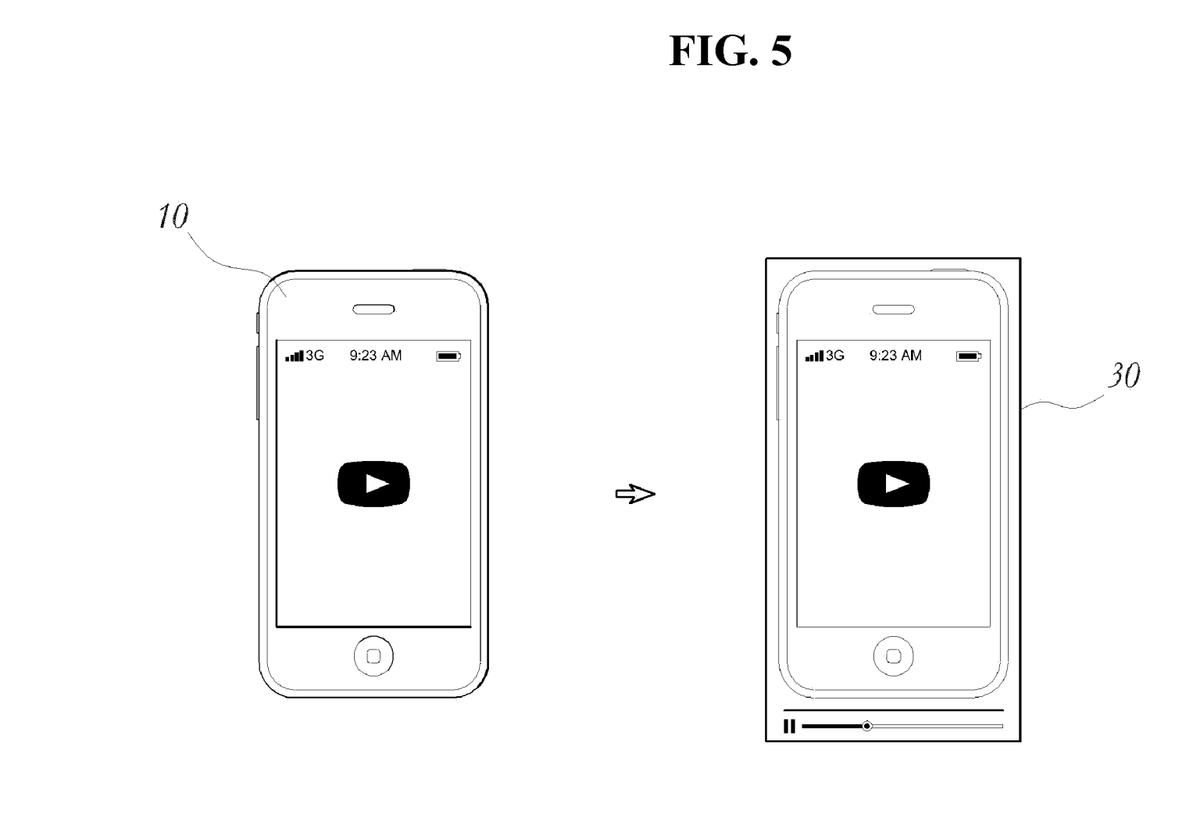
FIG. 5 is a view showing an example of a moving image output screen capture state according to an exemplary embodiment of the present invention.

As shown in FIG. 4, the synthetic data 30 created and stored through the process described above provides a further realistic capture image by reflecting the outer appearance of the mobile communication terminal 10 exactly as is. Since the finally created synthetic data 30 is stored in the memory device of the mobile communication terminal 10 in the form of an image file, it can be freely transmitted, viewed and edited like other image files, and the process described above can be applied to still images and moving images outputted through the display of the mobile communication terminal 10 as shown in FIG. 5. In the same manner, the process can be applied to a display output screen which varies in the process of handling the mobile communication terminal 10 by a user or in the process of executing an application program. If the synthetic data is not a still image, it is stored in the form of a moving image file.

Figure 6:
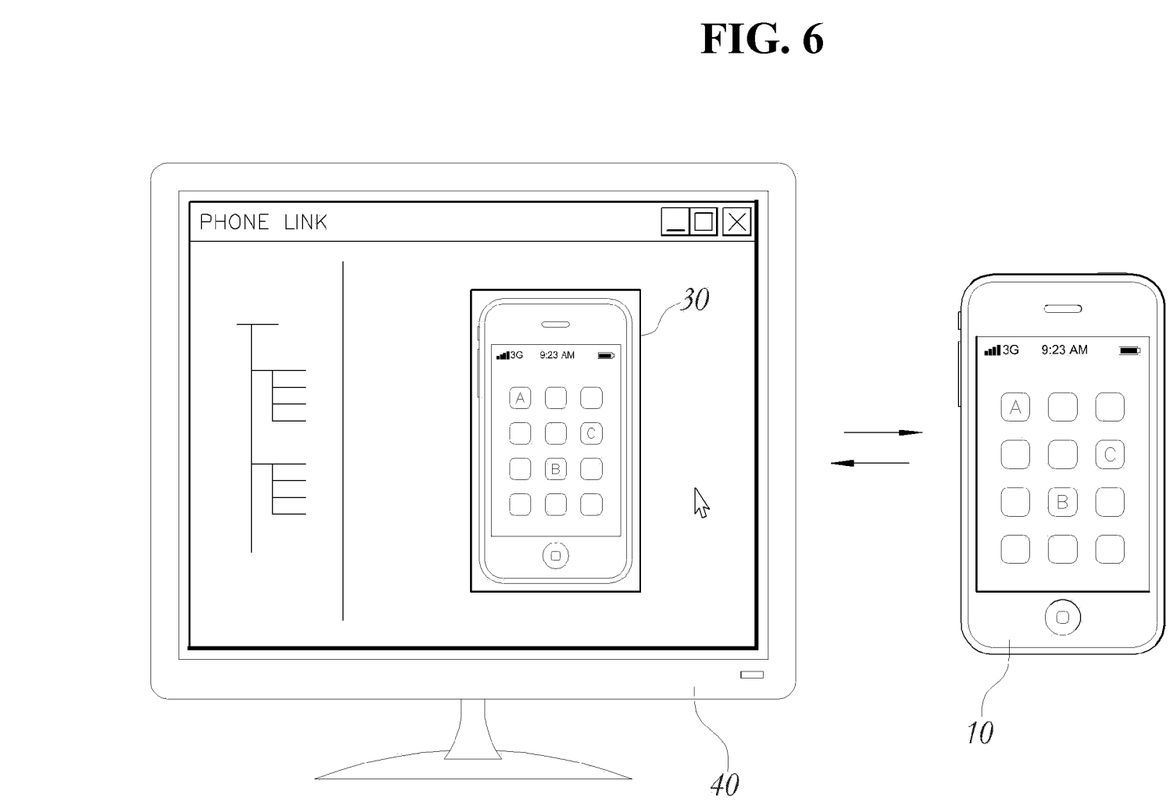
FIG. 6 is a view illustrating an exemplary embodiment of the present invention performed by a computer.

Meanwhile, the capture program of the present invention can be mounted on a computer 40 connected to the mobile communication terminal 10 as shown in FIG. 6, as well as being mounted on the mobile communication terminal 10. The capture program executed at this point is modularized in a control program of the mobile communication terminal 10 distributed by the manufacturing company of the mobile communication terminal 10 or the company manufacturing the operating system of the mobile communication terminal 10, or the capture program is mounted on the computer 40 as a separate application program.

The process of performing an embodiment according to the capture program mounted on the computer 40 is as described below.

First, the capture program mounted on the computer 40 connected to the mobile communication terminal 10 is executed and extracts screen data being outputted on the display of the mobile communication terminal 10, and the connection between the mobile communication terminal 10 and the computer 40 can be established in a variety of methods such as a wired or wireless Universal Serial Bus (USB), Bluetooth and a wireless LAN.

In the case where the capture program is modularized in the control program of the mobile communication terminal 10, as well as in the case where the capture program mounted on the computer 40 is an application program separated from the control program of the mobile communication terminal 10, when a connection, i.e., a communication path, is established between the computer 40 and the mobile communication terminal 10, the capture program first reads identification information of the mobile communication terminal 10. Here, although the range of the identification information can be adjusted depending on the process being executed, the identification information may include subscriber information such as a model number, a serial number, a phone number and the like of a corresponding mobile communication terminal 10. However, since the exemplary embodiment focuses on synthesizing an outer appearance image in capturing a display image of the mobile communication terminal 10, a basic embodiment can be accomplished although the identification information described above is limited to the model number of the mobile communication terminal 10.

The identification information of the mobile communication terminal 10 can be read only when the identification information is set as a prerequisite condition of establishing a communication path when the connection is based on a wireless network such as Bluetooth or wireless LAN, and thus the capture program may read the identification information without a problem in the exemplary embodiment of the present invention. In the case of USB which is currently the mainstream connection method between the computer 40 and the mobile communication terminal 10, it is standard to automatically read a device descriptor containing information on the manufacturing company, information on the product, a version of supporting USB, and a packet size after the host 40, i.e., a host, is connected to the mobile communication terminal 10, i.e., a device, and thus the capture program may smoothly read the identification information.

Once extraction of the screen data 21 is completed, the capture program reads the device image data 22 containing the shape of a corresponding mobile communication terminal 10 from the memory device of the computer 40. Since it is typical that various types of mobile communication terminals 10 share a single control program even when the capture program is modularized in the control program of the mobile communication terminal 10, it is preferable that a device image data 22 of each mobile communication terminal 10 is provided in the capture program and a corresponding device image data 22 is searched and read based on the identification information of the mobile communication terminal 10 described above.

Once the device image data 22 corresponding to the mobile communication terminal 10 connected to the computer 40 is completed to be read, the capture program creates the synthetic data 30 by combining the device image data 22 and the screen data 21 and stores the synthetic data 30 in the memory device, and as shown in FIG. 6, the synthetic data 30 the same as the real mobile communication terminal 10 is outputted in real-time through the computer 40.

Figure 7:
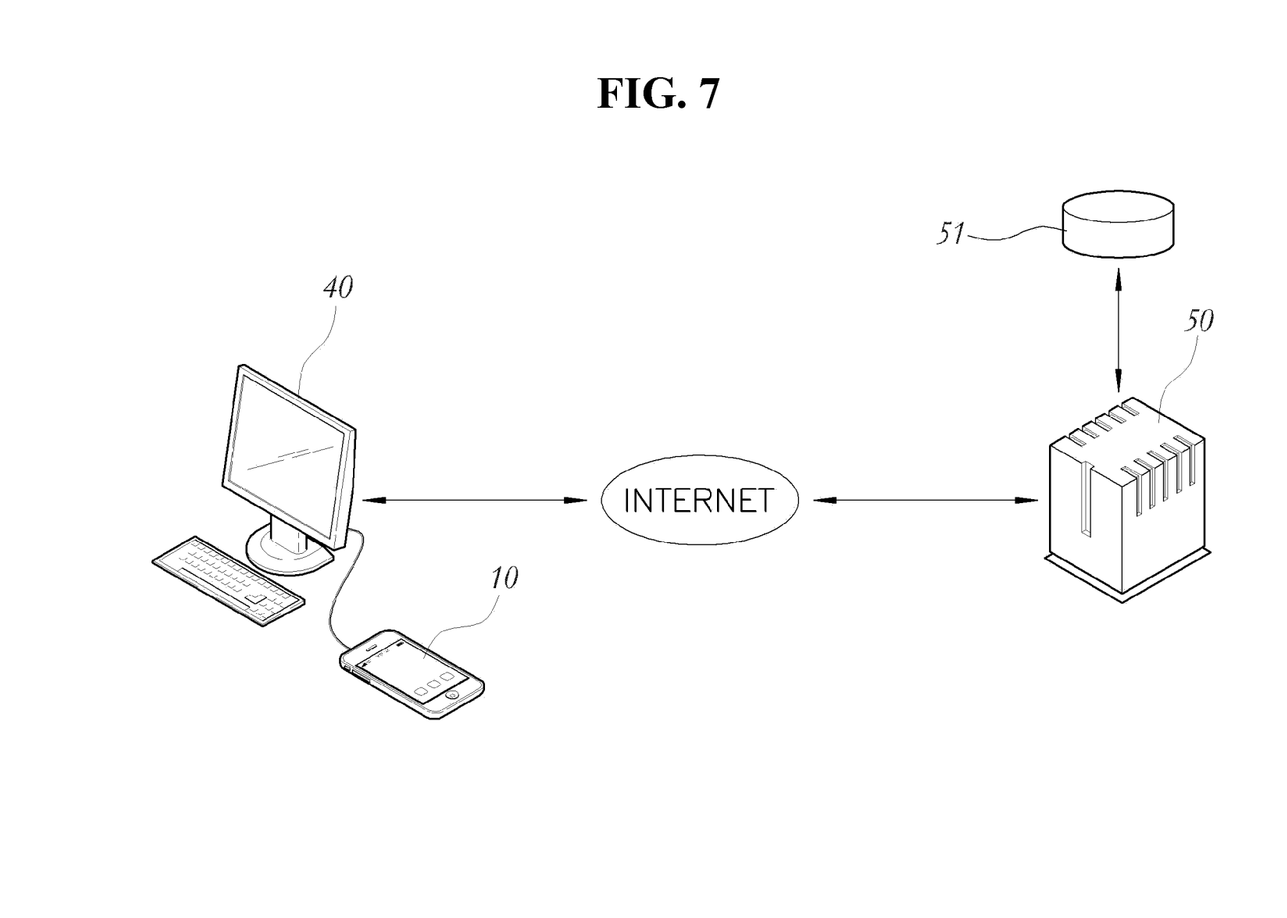
FIG. 7 is a view showing the configuration of an exemplary embodiment of the present invention performed by a computer and a server.

Meanwhile, in performing the present invention through the capture program mounted on the computer 40 as shown in FIG. 7, the device image data 22 is received from a server 50 constructed at a remote site and a database 51 containing device image data 22 of a plurality of mobile communication terminals 10. After executing the capture program mounted on the computer 40 connected to the mobile communication terminal 10 and extracting the screen data 21 being outputted on the display of the mobile communication terminal 10, the capture program transmits identification information of the mobile communication terminal 10 connected to the computer 40 to the server 50 of the remote site through the Internet. Then, the server 50 reads the device image data 22 containing the shape of a corresponding mobile communication terminal 10 by inquiring the database 51 using the received identification information and transmits the device image data 22 to the computer 40, and the capture program of the computer 40 receives the device image data 22, creates the synthetic data 30 by combining the device image data 22 with the screen data 21, and records the synthetic data 30 in the memory device of the computer 40. Through the embodiments supported by the remote server 50 and the database 51, it is possible to efficiently and promptly cope with the market situation of the mobile communication terminal 10 where new products are continuously released.

An image combining an output screen and an outer appearance of the mobile communication terminal 10 is created and stored in capturing a display screen of the mobile communication terminal 10 through the present invention, and thus a further realistic capture image can be provided, and utilization of the capture image can be enhanced. Therefore, in addition to securing convenience of users of the mobile communication terminal 10, the number of users of Internet services, such as blogs and SNS services which are important consumers of the capture images, can be increased, and related markets are revitalized.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A screen capturing method of a mobile communication terminal employing an image display as an output means as a mobile station of a mobile communication network, the method for capturing a display out screen of a mobile communication terminal, comprising the steps of:
   executing a capture program mounted on the mobile communication terminal and extracting a screen data being outputted on the display of the mobile communication terminal;
   reading a device image data containing a shape of the mobile communication terminal from a memory device of the mobile communication terminal, by the capture program; and
   creating a synthetic data by combing the read device image data with the screen data and recording the synthetic data in the memory device of the mobile communication terminal, by the capture program.

2. A screen capturing method of a mobile communication terminal employing an image display as an output means as a mobile station of a mobile communication network, the method for capturing a display out screen of a mobile communication terminal, comprising the steps of:
   executing a capture program mounted on a computer connected to the mobile communication terminal and extracting a screen data being outputted on the display of the mobile communication terminal;
   reading a device image data containing a shape of the mobile communication terminal from a memory device of the computer, by the capture program; and
   creating a synthetic data by combing the read device image data with the screen data and recording the synthetic data in the memory device of the computer, by the capture program.

3. A screen capturing method of a mobile communication terminal employing an image display as an output means as a mobile station of a mobile communication network, the method for capturing a display out screen of a mobile communication terminal, comprising the steps of:
   executing a capture program mounted on a computer connected to the mobile communication terminal and extracting a screen data being outputted on the display of the mobile communication terminal;
   transmitting identification information of the mobile communication terminal connected to the computer to a server at a remote site through an Internet, by the capture program;
   reading a device image data containing a shape of the mobile communication terminal by inquiring a database using the received identification information, and transmitting the device image data to the computer, by the server; and
   receiving the device image data, creating a synthetic data by combing the device image data with the screen data, and recording the synthetic data in a memory device of the computer, by the capture program of the computer.

4. A non-transitory computer readable medium containing program instructions executed by a processor for capturing a display out screen of a mobile communication terminal, comprising:
   program instructions that execute a capture program mounted on a device in a communication network and extract a screen data being outputted on the display of the mobile communication terminal;
   program instructions that read a device image data containing a shape of the mobile communication terminal from a memory device of the device in the communication network by the capture program; and
   program instructions that create a synthetic data by combing the read device image data with the screen data and recording the synthetic data in the memory device of the device in the communication network, by the capture program.

5. The non-transitory computer readable medium of claim 4, wherein the device in the communication network is the mobile communication terminal.

6. The non-transitory computer readable medium of claim 4, wherein the device in the communication network is a computer connected to the mobile communication terminal.

7. A non-transitory computer readable medium containing program instructions executed by a processor for capturing a display out screen of a mobile communication terminal, comprising:
   program instructions that execute a capture program mounted on a computer connected to the mobile communication terminal and extract a screen data being outputted on the display of the mobile communication terminal;
   program instructions that transmit identification information of the mobile communication terminal connected to the computer to a server at a remote site through an Internet;
   program instructions that read a device image data containing a shape of the mobile communication terminal by inquiring a database using the received identification information, and transmitting the device image data to the computer, by the server; and
   program instructions that receive the device image data, create a synthetic data by combing the device image data with the screen data, and record the synthetic data in a memory device of the computer, by the capture program of the computer.

* * * * *